United States Patent
Flachs et al.

(10) Patent No.: US 8,006,004 B2
(45) Date of Patent: Aug. 23, 2011

(54) NON-INTRUSIVE DEBUG PORT INTERFACE

(75) Inventors: Victor Flachs, Rishon-Le-Zion (IL); Nir Tasher, Tel Mond (IL); Nimrod Peled, Tel Aviv (IL); Leonid Shamis, Herzlia (IL); Shani Mayer, Kiryat Tivaon (IL)

(73) Assignee: Nuvoton Technology Corp., Science Based Industrial Park, Hsin-Chu (TW)

( * ) Notice: Subject to any disclaimer, the term of this patent is extended or adjusted under 35 U.S.C. 154(b) by 313 days.

(21) Appl. No.: 12/217,837

(22) Filed: Jul. 8, 2008

(65) Prior Publication Data
US 2010/0011130 A1    Jan. 14, 2010

(51) Int. Cl.
G06F 13/00    (2006.01)
G06F 3/00    (2006.01)

(52) U.S. Cl. .................. 710/40; 710/8; 710/32; 710/58; 710/62

(58) Field of Classification Search .................. None
See application file for complete search history.

(56) References Cited

U.S. PATENT DOCUMENTS

| | | | |
|---|---|---|---|
| 4,188,626 A * | 2/1980 | Frantz et al. ................ | 345/168 |
| 5,313,618 A | 5/1994 | Pawloski | |
| 5,659,680 A * | 8/1997 | Cunningham et al. .......... | 714/25 |
| 5,794,054 A | 8/1998 | Le et al. | |
| 5,978,902 A | 11/1999 | Mann | |
| 6,385,747 B1 | 5/2002 | Scott et al. | |
| 6,546,359 B1 | 4/2003 | Week | |
| 6,658,545 B1 | 12/2003 | Dayal | |
| 7,020,871 B2 | 3/2006 | Bernstein et al. | |
| 7,313,096 B2 | 12/2007 | Kocalar et al. | |
| 7,319,404 B2 | 1/2008 | Sturges et al. | |
| 2004/0164990 A1 * | 8/2004 | Chan et al. .................... | 345/581 |
| 2007/0094536 A1 | 4/2007 | Kocalar et al. | |

FOREIGN PATENT DOCUMENTS

WO   WO 2007/062256   5/2007

OTHER PUBLICATIONS

"Post-LCD: ISA/PCI Port 80/84H Post Error Debug Card"; downloaded from http://www.megacode.com/photo.htm on Apr. 11, 2008; 5 pages.

* cited by examiner

Primary Examiner — Ilwoo Park
Assistant Examiner — Scott Sun
(74) Attorney, Agent, or Firm — Robert G. Lev; Michael Factor

(57) ABSTRACT

A processor having a core configured to control a keyboard and a plurality of pins connected to the core, configured to transfer signals from the processor to the keyboard. A controller is configured to transfer signals from one or more registers through at least one of the pins, intermittently with signals transferred to the keyboard.

33 Claims, 8 Drawing Sheets

NON-INTRUSIVE DEBUG PORT INTERFACE

FIELD OF THE INVENTION

The present invention relates generally to processor architectures and specifically to sharing processor pins between tasks.

BACKGROUND

Processors are used for a very wide range of tasks. In designing processors, effort is made to minimize their size in order to reduce production costs and energy consumption. Particularly, it is desired to minimize the number of pins of a processor.

As processors are very complex, it is very useful during both prototyping and maintenance to view internal debugging codes of the processor. For this purpose, many processors and computer systems are designed with a small debugging area which collects debugging codes. Adding additional pins to the processor in order to output the collected debugging codes for viewing by a human user is, however, considered wasteful, particularly since debugging is performed quite rarely compared to the total utilization of the processor.

U.S. patent publication 2004/0164990 to Chan et al., titled "Method, Controller and Apparatus for Displaying BIOS Debug Message", the disclosure of which is incorporated herein by reference, describes a display device and interface for displaying debugging codes of a processor.

A paper titled: "POST-LCD: ISA/PCI Port 80/84H Post Error Debug Card", from Megacode technology, downloaded from http://www.megacode.com/photo.htm, on Apr. 11, 2008, the disclosure of which is entirely incorporated herein by reference, shows a display device for displaying debugging codes. This paper suggests that the debugging codes are provided to the display device over a system bus, such as an ISA or PCI bus. This, however, requires an empty slot on the bus for the display device or disconnection of one of the other devices connected to the bus. Such disconnection changes the conditions of the system being debugged, which may eliminate the cause of the problem which is to be detected and thus prevents diagnosing the problem. Furthermore, the use of the bus requires a relatively large and expensive interface which is beyond that required for the relatively simple task involved.

Other devices use a serial bus, such as SMBus, SPI or UART, to convey the debugging codes from the processor.

U.S. Pat. No. 7,313,096 to Kocalar et al., Titled: "Multiplexing a Communication Port", suggests connecting a communication board for designing, testing and debugging a processor, in parallel to a hard disk connected to the processor, such that the processor pins used are shared therebetween. An out-of-band signal is used to indicate to the processor whether it is communicating with the hard disk or with the communication board. This solution, however, uses a special pin for selection between the hard disk and the communication board. In addition, it is intrusive in that it does not allow passive receiving of debugging signals while the processor communicates with the hard disk.

U.S. Pat. No. 6,658,545 to Dayal, titled: "Passing Internal Bus Data External to a Completed System", the disclosure of which is entirely incorporated herein by reference, describes using a bus connecting to an external memory unit also for connecting a monitoring unit, for debugging. The bus is designed to have time periods in each cycle in which it is not used for communication with the external memory and during these periods the bus is used for transferring debugging information. This approach requires that the bus have such idle periods, and also requires complicated timing of the bus access.

SUMMARY OF THE INVENTION

An aspect of some embodiments of the present invention relates to a processor configured to output information through one or more pins connecting the processor to a keyboard. Optionally, one or more pins used for outputting scanning signals to the keyboard are used to carry information in a manner which does not substantially interfere with the keyboard operation.

In some embodiments of the invention, the outputted information includes debug codes, which are transferred to a debug code display connected externally to one or more keyboard lines.

Optionally, whenever information is transmitted on the one or more keyboard lines in a manner which may interfere with the reading of keyboard signals by the processor, the processor extends the transfer duration of the keyboard scanning signals and/or delays the reading of the results in a manner which assures correct reading of the keyboard. Optionally, these acts are performed without changing the firmware of the processor relative to a state in which the keyboard lines are not used for transmission of information.

An aspect of some embodiments of the present invention relates to a method of sharing one or more output lines of a processor between first and second units of the processor. The method includes transmitting an output from the second unit each time the signals provided by the first unit onto the one or more output lines change, so that an external device receiving the output of the second unit is not substantially affected by the signals provided by the first unit.

In an exemplary embodiment of the invention, the second unit provides signals which change at a much higher rate than the signals provided by the first unit, for example at least an order of magnitude greater. Possibly, the second unit provides signals which change at least 10 times or even at least 100 times faster than the rate of change of the signals of the first unit. The term rate of change refers herein to the number of times the value of the signal changes within a predetermined period.

An aspect of some embodiments of the present invention relates to a method of sharing one or more output lines of a processor between first and second units of the processor. The method includes stalling the operation of the first unit, by the second unit, if it is determined by the second unit that its operation may have interfered with the correct operation of the first unit. The second unit optionally uses the time in which the first unit is stalled to prepare conditions ensuring correct operation of the first unit.

In some embodiments of the invention, the first unit is stalled by stalling the bus of the processor.

There is therefore provided in accordance with an embodiment of the invention, a processor, comprising a core configured to control a keyboard; a plurality of pins connected to the core and configured to transfer signals from the processor to the keyboard; one or more registers, and a controller configured to transfer signals from the one or more registers through at least one of the pins, intermittently with signals transferred to the keyboard.

Optionally, the core comprises an embedded controller configured to control systems of a notebook computer. Optionally, the one or more registers comprise at least two registers. Optionally, the one or more registers comprise debug code registers configured to store debug codes of the processor. Optionally, the one or more registers comprise debug code registers configured to store debug codes of a different processor, than the processor including the registers.

Optionally, the controller is configured to transfer content from the one or more registers through the at least one of the pins each time there is a change in signals directed to the keyboard transmitted through the at least one pins. Optionally, the controller is configured to initiate transfer of content from the one or more registers through the at least one of the pins each time there is a change in a value of the one or more registers. Optionally, the controller is configured to delay transfer of content from the one or more registers through the at least one of the pins when the core is reading signals from the keyboard. Optionally, the controller is configured to abort transmission of content from the one or more registers through the at least one of the pins, in response to one or more occurrences in the processor.

Optionally, the controller is configured to abort transmission of content from the one or more registers through the at least one of the pins, in response to a request to read input from the keyboard and/or in response to a change in the content of the one or more registers.

Optionally, the processor has a normal state in which the controller is inactive and a debug display mode in which the controller is active, and wherein firmware of the core is not changed in the switching between the normal state and the debug display mode. Optionally, the controller is configured to operate properly without cooperation from the firmware of the core. Optionally, the controller is configured to delay reading of input from the keyboard until sufficient time has passed from transferring signals from the one or more registers through the one or more pins.

Optionally, the controller is configured to delay reading of input from the keyboard by stalling a bus of the processor. Optionally, the controller is configured to provide a strobe signal along with each transfer of signals from the one or more registers.

There is further provided in accordance with an embodiment of the invention, a processor, comprising: at least one multi-purpose output pin; a first unit configured to transfer signals through the multi-purpose output pin; a second unit configured to transfer signals through the multi-purpose output pin; and a controller configured to stall the operation of the first unit, responsive to a determination that a transmission from the second unit through the multi-purpose output pin may interfere with correct operation of the first unit.

The term multi-purpose output pin refers herein to any pin having two or more purposes, for example connected to two or more different external units, and therefore includes dual-purpose pins, as will as pins having three or more purposes.

Optionally, the controller is configured to ensure that output from the first unit is provided without interruption through the multi-purpose output pin for at least a predetermined time before the first unit reads input from a device external to the processor. Optionally, the controller is configured to abort transfer of signals from the second unit responsive to at least one specific occurrence within the processor. Optionally, the first unit comprises a keyboard controller. Optionally, the second unit comprises a debug code provider.

There is further provided in accordance with an embodiment of the invention, a processor, comprising at least one multi-purpose output pin; a first unit configured to transfer signals through the multi-purpose output pin; a second unit configured to transfer signals through the multi-purpose output pin; and a controller configured to initiate transfer of signals from the second unit through the multi-purpose output pin whenever there is a change in the signals provided by the first unit on the multi-purpose output pin and the second unit is not already transferring signals on the multi-purpose output pin.

Optionally, the first unit comprises a keyboard controller. Optionally, the second unit comprises a debug code provider. Optionally, the second unit provides signals which change at an order of magnitude greater than the signals provided by the first unit. Optionally, the second unit provides a strobe signal with the signals which change at an order of magnitude greater than the signals provided by the first unit.

There is further provided in accordance with an exemplary embodiment of the invention, a method of outputting information from a processor, comprising storing information in one or more registers within a processor; providing keyboard scan signals via a specific pin of a processor, and transmitting the information stored in the one or more registers, via the specific pin of the processor.

Optionally, storing the information comprises storing debug codes. Optionally, providing keyboard scan signals via the specific pin comprises providing the scan signals less than 10% of the processor operation time. Optionally, transmitting the information comprises initiating transmission of the information each time the keyboard scan signal begins or ends, unless the state of the processor requires delay of the transmission.

Optionally, transmitting the information comprises transmitting at times selected independent of timing of a keyboard scan process providing the keyboard scan signals. Optionally, transmitting the information comprises transmitting at times selected independent of whether keyboard scan signals are being provided via the specific pin. Optionally, the method includes stalling a keyboard read process of the processor responsive to identification of an attempt to read a state of the keyboard within a minimal settling time from a transmission of the information.

BRIEF DESCRIPTION OF THE FIGURES

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

Overview

Figure 1:
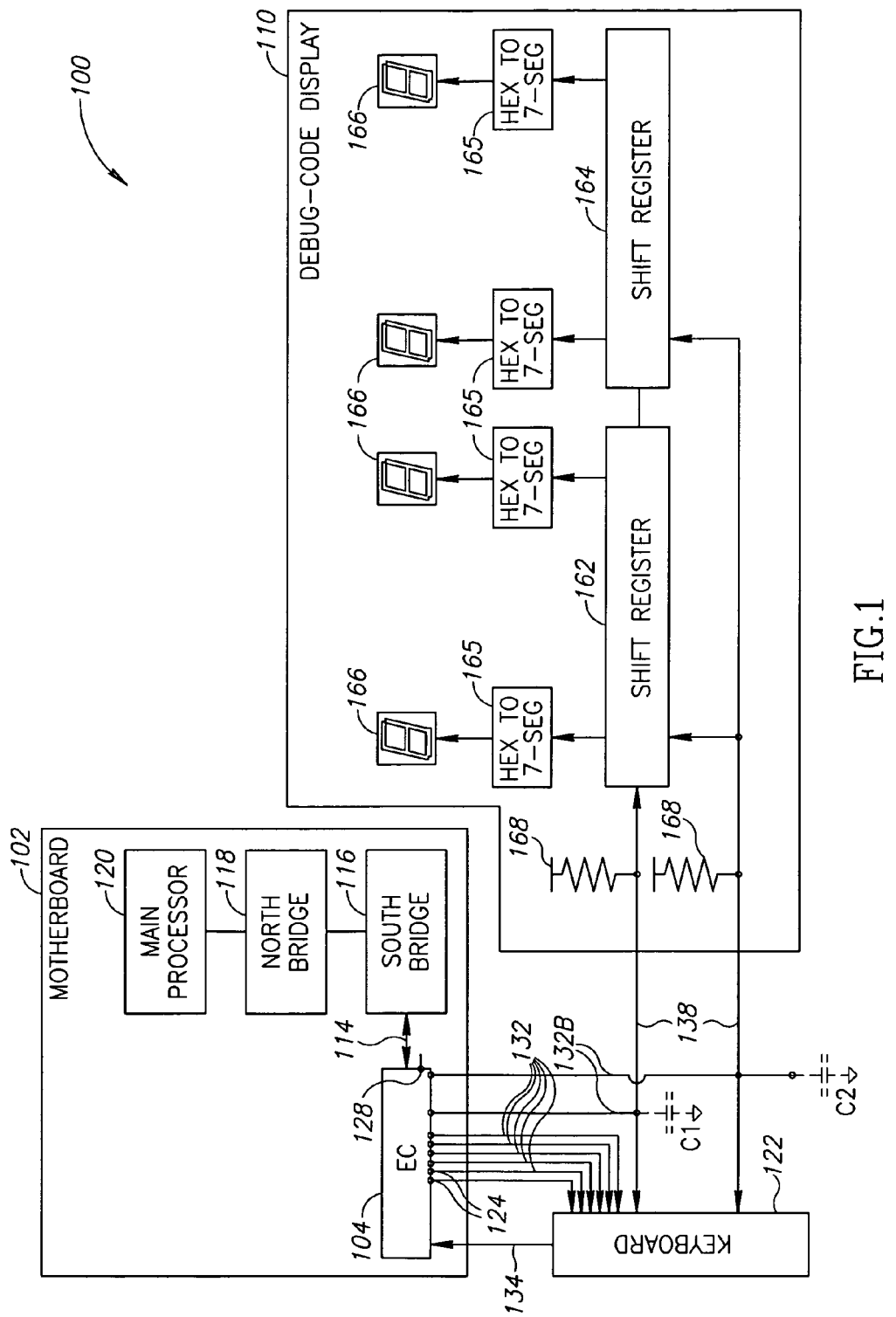
FIG. 1 is a schematic illustration of a computer system with a debug-code display connected thereto, in accordance with an exemplary embodiment of the invention.

FIG. 1 is a schematic illustration of a computer system 100 with a debug-code display 110 connected thereto, in accordance with an embodiment of the invention. Computer system 100 includes, for example, a motherboard 102, such as of a notebook computer, having a main processor 120 mounted thereon. In addition, an embedded controller (EC) 104, which controls one or more peripherals of computer 100, such as a keyboard 122, a mouse, a screen, a power supply and/or a battery (not shown) is mounted on motherboard 102. In an exemplary embodiment of the invention, EC 104 is connected to main processor 120 through an LPC bus 114, a south bridge 116 and a north bridge 118, as is known in the art.

EC 104 optionally connects to keyboard 122 through a plurality of keyboard-out lines 132 (leading from the EC 104 to keyboard 122), for example eighteen lines, and a plurality of keyboard-in lines 134, for example eight lines. It is noted that other numbers of keyboard lines may be used, depending on the size of the keyboard. Relatively small keyboards may use four or more out-lines 132, while larger keyboards may require at least ten or even fifteen out-lines or more. Lines 132 and 134 extend from units within EC 104 through pins 124 of EC 104, along motherboard 102 and out of the motherboard through a keyboard cable, such as a flat cable, known in the art. In operation, EC 104 cyclically places scanning signals on keyboard-out lines 132 and collects response signals from the keyboard via keyboard-in lines 134.

EC 104 collects debug codes of its own and/or of main processor 120, for example of the BIOS POST thereof, in one or more internal registers. In a debug mode, the debug codes are periodically transmitted from EC 104 to a debug code display 110 for viewing by a technician, for example.

One or more of the keyboard-out lines 132, two lines 132B in the example of FIG. 1, are connected in parallel to their connection to keyboard 122 to debug code display 110, through extension lines 138. Any signals transmitted by EC 104 onto these two out lines 132B are provided both to keyboard 122 and to debug-code display 110. The transfer of the keyboard scanning signals and the debug codes onto lines 132B is optionally performed in a manner which allows transmitting both signals on the same lines, without significantly disturbing the operation of keyboard 122 or of debug-code display 110. Furthermore, in some embodiments of the invention, keyboard 122 and/or debug-code display 110 operate as if lines 132B carry only signals directed to them and are not required to filter out the signals directed to the other device.

Debug-code display 110 optionally includes a pair of shift registers 162 and 164 which receive the debug codes and transfer them through hex-to-7-segment converters 165 to hexadecimal displays 166. It is noted that debug code displays 110 with fewer or more hexadecimal displays 166 may be used. Resistors 168 connected to each of extension lines 138 and to a base voltage Vcc, are used with proper resistance values to ensure proper rise time of the signals on lines 132B, in view of the parasitic capacitance of display 110 and extension lines 138.

Embedded Controller

Figure 2:
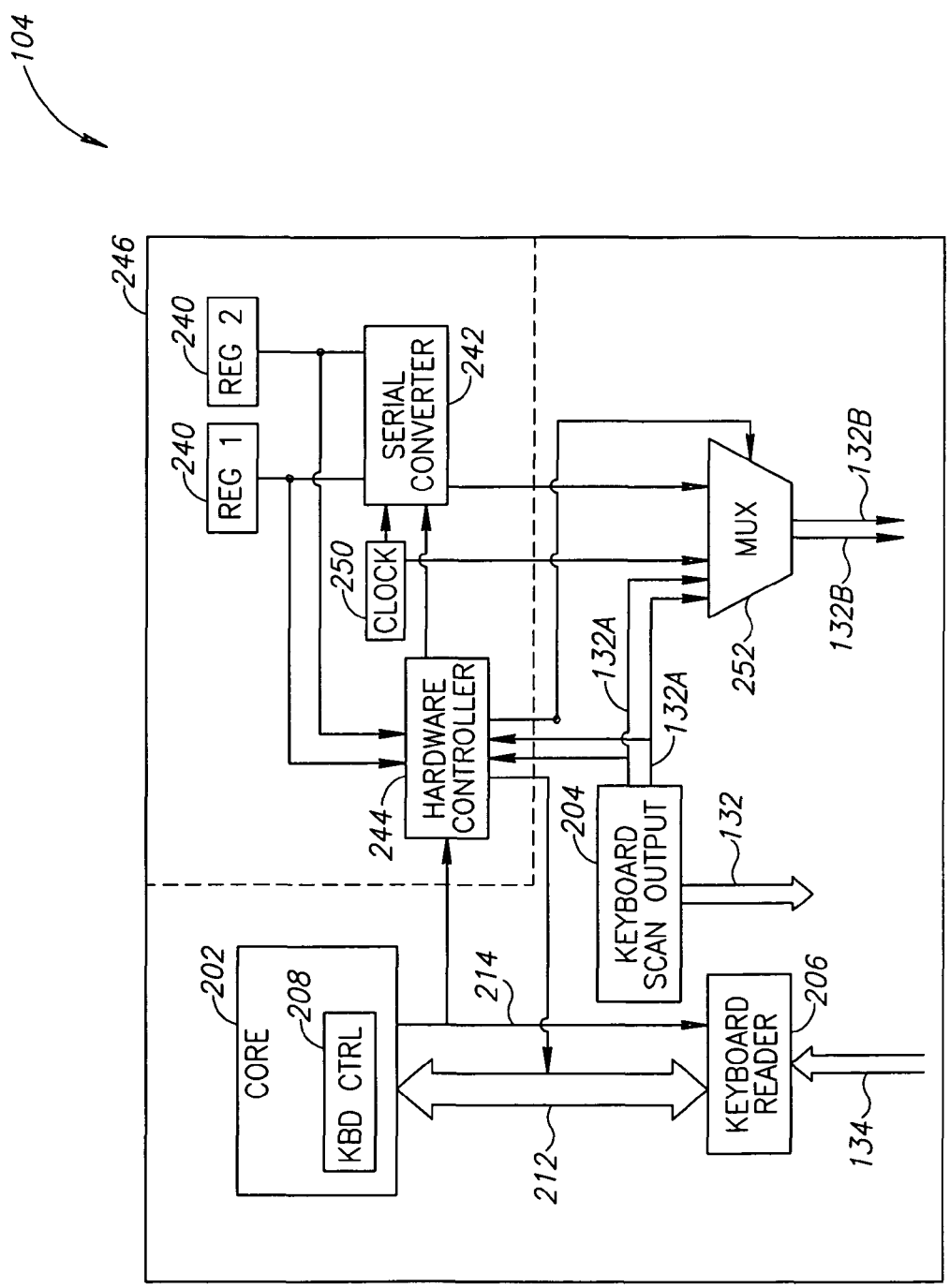
FIG. 2 is a schematic diagram of an embedded controller, in accordance with an exemplary embodiment of the invention, showing only elements relevant to the present invention.

FIG. 2 is a schematic diagram of embedded controller 104, in accordance with an exemplary embodiment of the invention, simplified to show only elements relevant to the present invention. Embedded controller 104 optionally includes a keyboard scan output unit 204, which generates the scanning signals for lines 132. EC 104 also includes a keyboard input register 206 which stores the signals from keyboard-in lines 134. A firmware keyboard control process 208, running on a core 202 of EC 104, controls the operation of keyboard scan output unit 204. In addition, keyboard control process 208 reads the inputs from keyboard register 206 over a bus 212 and determines therefrom which keys were pressed on keyboard 122. In some embodiments of the invention, keyboard control process 208 provides reading instructions to keyboard register 206, over control line 214. The reading instructions are provided at least a required time after a respective scanning signal is provided to the keyboard, allowing settling of transient effects.

The scanning signals of most of lines 132, are provided directly onto the output lines 132. For lines 132B, however, the scanning signals are optionally passed on internal lines 132A to a multiplexer 252, which is controlled by a hardware controller 244 to direct onto lines 132B either the signals from internal lines 132A or debug codes, as described hereinbelow with reference to FIGS. 5, 7 and 9. Hardware controller 244 optionally additionally controls other units of EC 104 in a manner which allows coexistence of the keyboard scanning signals and transmission bursts of debug codes on lines 132B.

Keyboard scan output unit 204 optionally includes a register, for each of lines 132, which carries the value placed on the line. Keyboard control process 208 controls the contents of the registers of keyboard scan output unit 204, timing the scanning signals of the keyboard.

Figure 3:
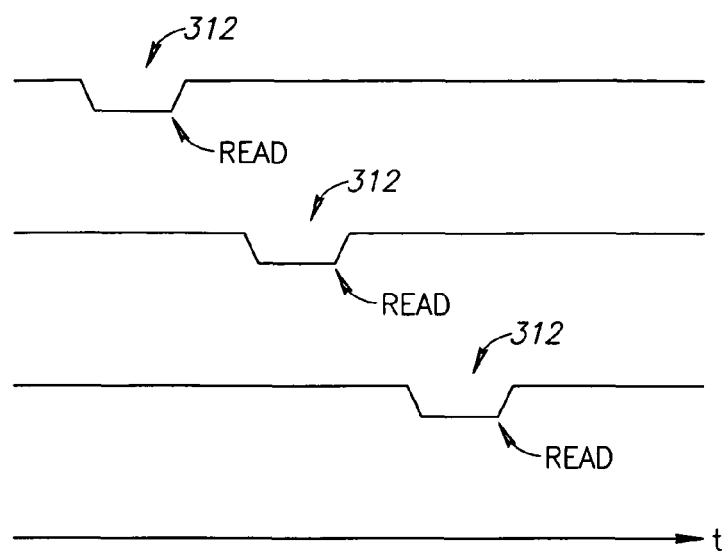
FIG. 3 is a schematic illustration of keyboard scan signals provided on keyboard output lines, in accordance with an exemplary embodiment of the invention.

FIG. 3 is a schematic illustration of the scan signals provided by keyboard scan output unit 204 for several of lines 132, in accordance with an exemplary embodiment of the invention. When not carrying a scan signal, lines 132 are held at a constant high voltage level. Keyboard scan output unit 204 sequentially places a low voltage scanning signal 312 on one of lines 132. After a duration sufficient to charge the parasitic capacitance of keyboard 122, such that the values on keyboard-input lines 134 are expected to be stable, keyboard control process 208 requests to read the results from keyboard register 206, for example via control line 214, and the low voltage scanning signal 312 is then terminated, by applying a high voltage onto the line 132. Keyboard scan output unit 204 then applies a scan signal 312 to a subsequent line 132.

The duration of scanning signals 312 may depend on the specific type of keyboard 122 and/or may reflect preferences of a programmer of keyboard control process 208. For example, a programmer may prefer to use a scanning signal longer than the minimum required to ensure that the keyboard readings are taken after settling of any transient effects of the scanning signal. The length of the scanning signal 312 is typically between 0.5-4 milliseconds, although the invention is not limited to any specific scanning signal length and may be implemented with shorter or longer scanning signal durations. In some embodiments of the invention, the length of the scanning signal 312 is longer than the duration of the transmission of debug codes, possibly at least five or ten times longer. Each line 132 usually carries scanning signals for less than 10% of the time, optionally less than 6% of the time.

Referring back tp FIG. 2, EC 104 additionally includes a port-80 output unit 246 (delineated in FIG. 2 from the rest of EC 104 by a dashed line, for clarity) which provides debug codes onto lines 132B in a format suitable for use by debug code display 110, when EC 104 is in a debug display mode. Port-80 output unit 246 optionally includes one or more registers 240 which are continuously updated with debug codes of host processor 120 and/or of EC 104. In some embodiments of the invention, registers 240 are continuously updated regardless of whether port-80 output unit 246 is in a debug display mode. Alternatively, registers 240 are updated only when port-80 output unit 246 is in the debug display mode. Port-80 output unit 246 includes a serial converter 242 which converts the signals in registers 240 into serial signals for transmission on a single line. A clock 250 optionally provides a transmission timing signal which accompanies the signals from serial converter 242.

Figure 4:
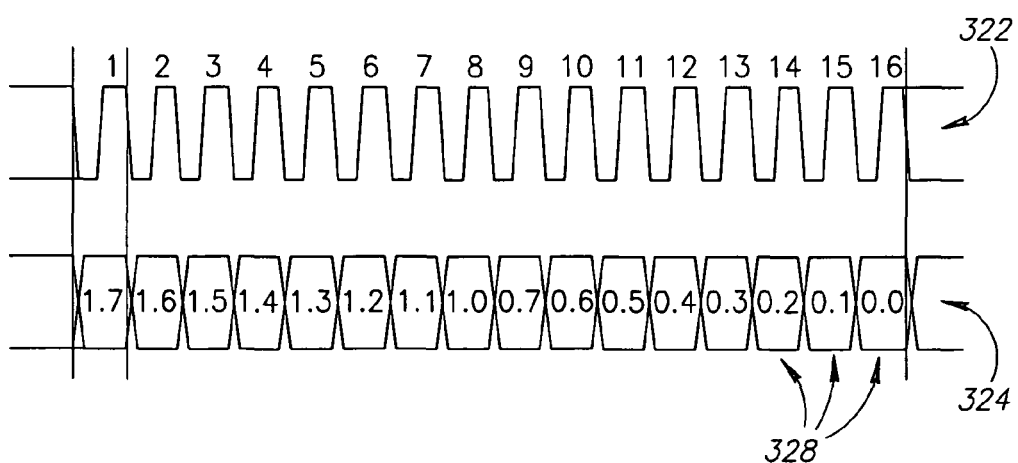
FIG. 4 is a schematic illustration of signals generated by a port-80 output unit, in accordance with an exemplary embodiment of the invention.
Figure 5:
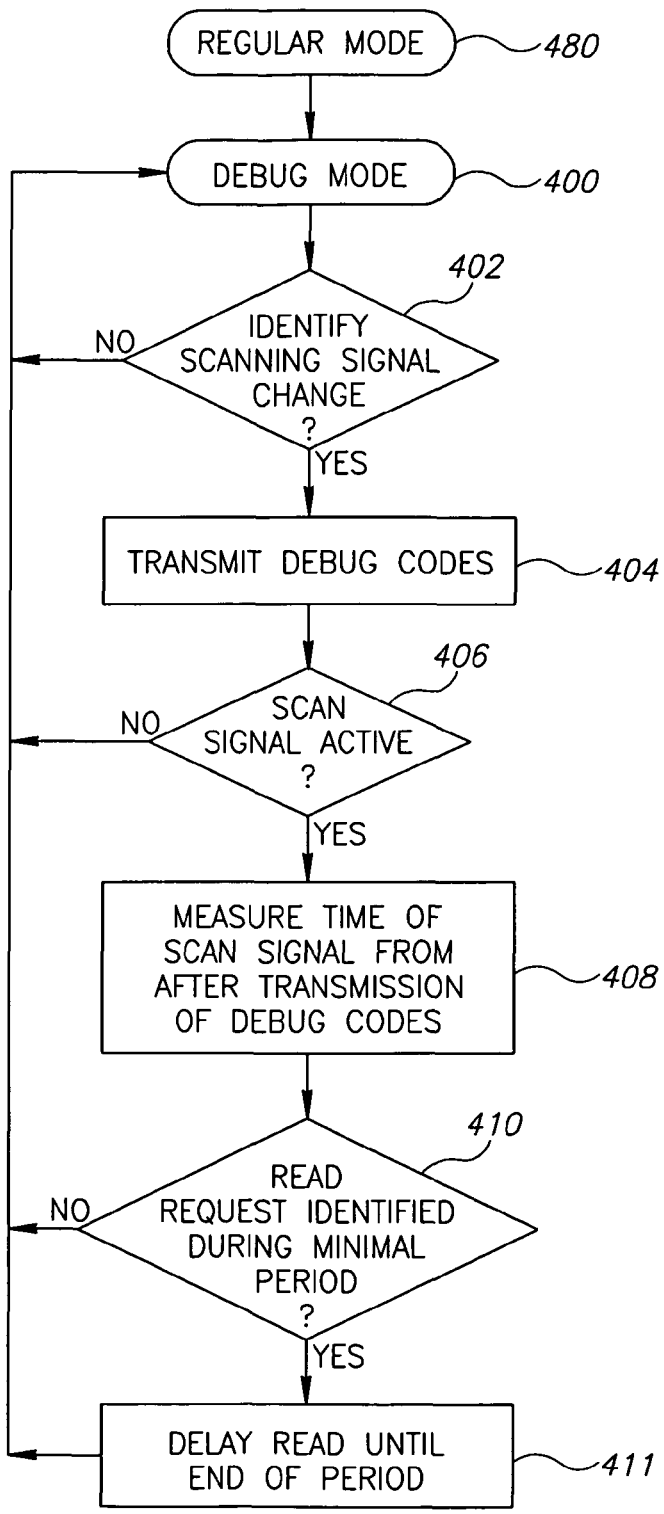
FIG. 5 is a flowchart of acts performed by a hardware controller in managing transmission of different signals on the same lines, in accordance with an exemplary embodiment of the invention.

FIG. 4 is a schematic illustration of signals 322 and 324 generated by port-80 output unit 246 for transmission on lines 132B, in accordance with an exemplary embodiment of the invention. A clock signal 322 alternating at a predetermined rate, defines a data rate for a data signal 324, which encodes a bit from registers 240 in each clock cycle 328. In the example of FIG. 4, data signal 324 carries 16 bits, 8 bits (designated 1.7-1.0) from a first register 240 and 8 bits (designated 0.7-0.0) from a second register 240. Clock signal 322 optionally has a 50% duty cycle, although any other suitable duty cycle may be used. Optionally, clock signal 322 operates at a rate of at least 50 KHz or even at least 200 KHz, in order to allow fast transmission of the debug codes, thus minimizing the utilization of lines 132B for debug codes. Optionally, the clock signal rate is selected to allow transmission of the debug codes in a period shorter than scanning signal 312 (FIG. 3). On the other hand, clock signal 322 is optionally of a rate, lower than 10 MHz, or even lower than 1 MHz, in order to allow for simple transmission and reception apparatus. In an exemplary embodiment of the invention, clock signal 322 is generated by dividing the clock signal of core 202 by 64. Controller FIG. 5 is a flowchart of acts performed by hardware controller 244, in accordance with an exemplary embodiment of the invention. In a regular operation mode 480, hardware controller 244 is inactive and multiplexer 252 (FIG. 2) is continuously set to pass the keyboard scan signals from lines 132A to lines 132B. When debug codes from EC 104 are desired, hardware controller 244 is moved into a debug display mode 400 and debug code display 110 (FIG. 1) is connected to lines 132B.

Optionally, in debug display mode 400, multiplexer 252 is set by default to transfer signals from lines 132A onto lines 132B. Only when it is determined that the content of registers 240 is to be exported, hardware controller 244 changes the setting of multiplexer 252 and instructs serial converter 242 to transmit the debug signals.

Hardware controller 244 optionally prevents display 110 from displaying incorrect information due to interpreting scanning signals as information, by initiating transmission of the contents of registers 240 after the end of each scanning signal, on each of lines 132B connected to display 110. Thus, even if the scanning signals alter the output of display 110, the contents of the display is corrected within a very short time period, such that the effect of the keyboard scanning signal 312 on display 110 is negligible, either unnoticeable by humans or perhaps resulting in a flicker. In some embodiments of the invention, hardware controller 244 additionally transmits the contents of registers 240 at the beginning of each keyboard scanning signal 312, so that the change from high to low voltage at the beginning of a scanning signal 312 on any of lines 132B connected to display 110 does not have a lasting effect on the output of display 110.

Optionally, whenever hardware controller 244 (FIG. 2) identifies (402) the beginning or ending of a scanning signal on one of lines 132A, controller 244 instructs serial converter 242 and multiplexer 252 to transmit (404) the debug codes from registers 240 onto lines 132B. When the transmission of the debug codes is completed, multiplexer 252 is returned to transferring the signals from lines 132A to lines 132B. If (406) after the transmission (404) of the debug codes, one of the signals from lines 132A is in the middle of a scan signal 312, controller 244 begins to measure (408) the time from the reconnection of line 132A to line 132B. Controller 244 is optionally configured with a minimal settling period during which the scan signal 312 is required to be applied to the keyboard 122 in order to ensure that the correct keyboard input is read. If (410) the measured time reaches the minimal settling period value without an attempt of core 202 to read results from keyboard register 206 being identified, the keyboard input will be read correctly without requiring intervention from controller 244. If (410), however, a request to read the keyboard input is identified on line 214 before the minimal settling period has passed, controller 244 delays (411) the reading of the keyboard input and any change in the values on lines 132A, until the minimal settling period value is reached. In some embodiments of the invention, the delay of the reading of the keyboard input is achieved by stalling bus 212 for the remaining time, and thus preventing the reading from being completed and the values on lines 132A from being changed.

Figure 6:
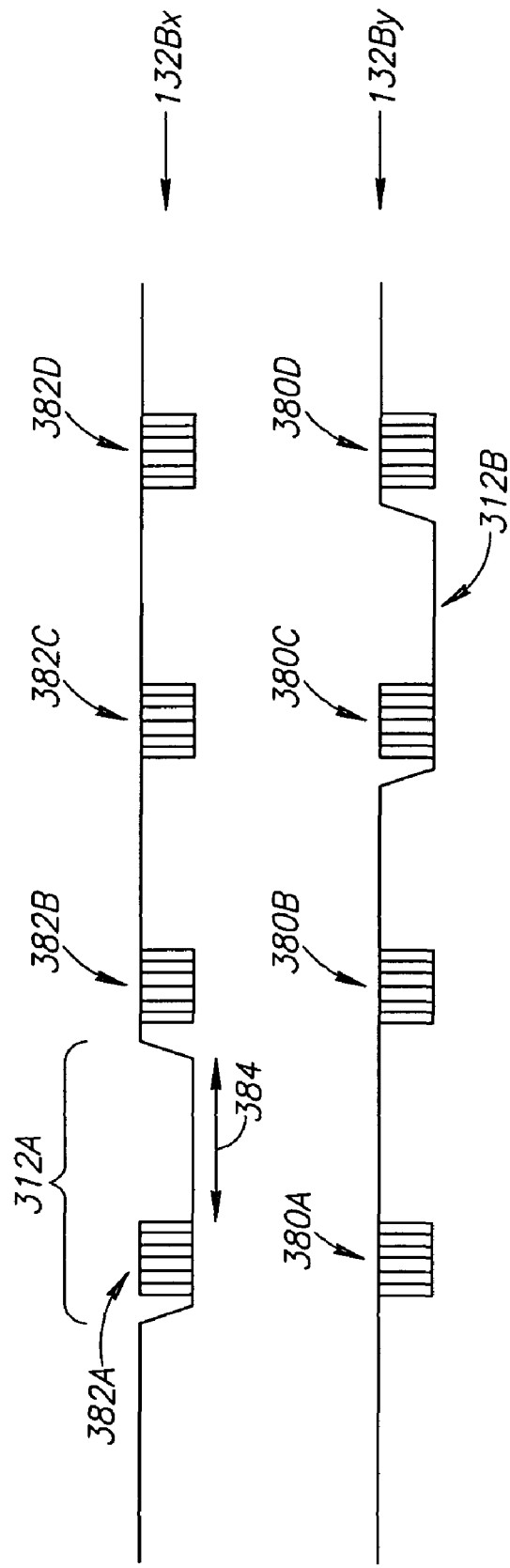
FIG. 6 is a schematic illustration of the signals transmitted on multi-purpose lines, in accordance with an exemplary embodiment of the present invention, following the method of FIG. 5.

FIG. 6 is a schematic illustration of the signals transmitted on lines 132B, in accordance with an exemplary embodiment of the present invention, following the method of FIG. 5. When one of lines 132A is set to a low voltage, signaling the beginning of a scan keyboard signal 312A, controller 244 initiates transmission of a burst 382A conveying the contents of registers 240 to display 110 on a first line 132Bx (which in the example of FIG. 6 is the line on which the identified scan keyboard signal 312A was identified, but it could be the other line), accompanied by a clock signal 380A on the second line 132By. If the time remaining until the end of the scan signal 312A is shorter than the minimal settling period, bus 212 is stalled, so that the time 384 between the end of burst 382A and the end of scanning signal 312A is equal to (or is longer than) the minimal settling period. After scanning signal 312A is completed, another burst 382B is transmitted in parallel to a clock signal 380B. Thereafter, a scan signal 312B is placed on the second line 132By and when it starts, the transmission of a burst 382C, along with a clock signal 380C, is initiated by controller 244. When the scan signal 312B finishes, another burst 382D and accompanying clock signal 380D are transmitted.

In some embodiments of the invention, if scan signal 312B begins before the transmission of burst 382B is completed, controller 244 aborts the transmission of burst 382B and begins the transmission of burst 382C. Alternatively, controller 244 completes the transmission of burst 382B and then begins scan signal 312B, without transmitting burst 382C.

It is noted that in some cases keyboard scan output unit 204 does not perform keyboard scanning unless it is known that a button on the keyboard was pressed. In such cases, transmission of debug codes every keyboard scan cycle may not be sufficient. In some embodiments of the invention, controller 244 has a timer which initiates transmission of debug codes whenever a keyboard scan was not carried out for longer than a predetermined period. Alternatively, any of the following described embodiments may be used.

In the above description of the embodiment of FIG. 5, the time measurement (408) after the transmission (404) of debug codes is performed only if one of lines 132A is carrying a keyboard scan signal 312A (FIG. 6). In other embodiments of the invention, the time measurement (408) is performed after every time a scan signal is transmitted, regardless of whether any of lines 132A is carrying a keyboard scan signal. In addition, the bus 212 is optionally stalled (411) in these embodiments if an attempt to read keyboard register 206 is identified before the minimal settling period is reached, regardless of whether the reading is performed responsive to a scan signal on lines 132B or any other line 132. These embodiments are optionally used when the transmission of debug codes on lines 132B may interfere with the correct reading of signals from the keyboard also in response to scan signals on other lines.

Second Embodiment

Figure 7:
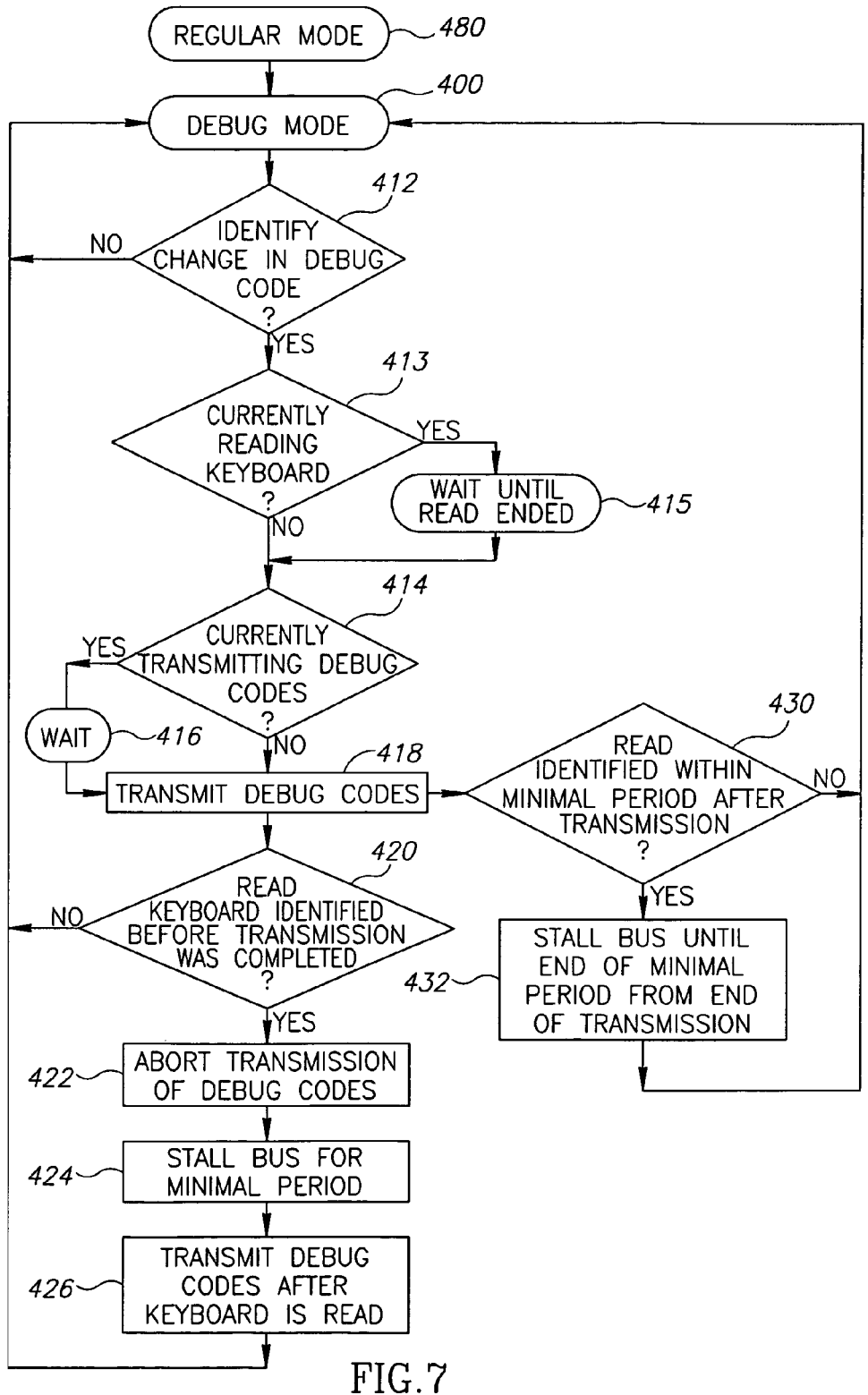
FIG. 7 is a flowchart of acts of a hardware controller, in accordance with another exemplary embodiment of the invention.

FIG. 7 is a flowchart of acts of controller 244, in accordance with another exemplary embodiment of the invention. While in the embodiment of FIG. 5, the transmission of the contents of registers 240 every keyboard scanning cycle is considered sufficient for debugging purposes, in the embodiment of FIG. 7, the contents of registers 240 are generally exported to display 110 immediately upon a change in the contents of one or more of the registers 240.

In addition, in the embodiment of FIG. 7, bursts of code signals are not necessarily transmitted after each change in the keyboard scan signals. Instead, in some embodiments of the invention, display 110 includes a shape filter which identifies and removes scanning signals from the signals on lines 138. It is noted, however, that having hardware controller 244 initiate transmission of the contents of registers 240 after each scanning signal allows the hardware of display 110 to be simpler and hence cheaper. Alternatively, the average rate of debug code change is trusted to overcome any problems due to the keyboard scan signals. Further alternatively, shift registers 162 and 164 (FIG. 1) are latched by a strobe signal and their contents are provided to hexadecimal displays 166 only responsive to reception of the strobe signal. Optionally, a separate pin 128 (FIG. 1) of EC 104 and corresponding line (not shown) not used in communicating with the keyboard 122 conveys the strobe signal from EC 104 to display 110. The separate line is optionally dedicated for use as the strobe signal, at least when EC 104 operates in the debug mode. The strobe of shift registers 162 and 164 is optionally edge triggered or level triggered to activate shortly after the transmission of a burst of debug codes is completed.

It is noted that instead of a strobe signal which controls output of the content of shift registers 162 and 164 to hexadecimal displays 166, a latching signal which controls the update of shift registers 162 and 164 may be used. In such embodiments, the latching signal is optionally asserted shortly before the burst is provided and is terminated shortly after the burst is completed.

Optionally, in the embodiment of FIG. 7, whenever (412) the contents of one or more of registers 240 changes, controller 244 determines whether (413) the keyboard is currently being read, and if so, controller 244 waits (415) until the reading is completed. Controller 244 additionally checks (414) whether transmission of a previous debug signal is in progress. If (414) a previous transmission is in progress, controller 244 waits (416) until the previous transmission is completed and then moves on with the current transmission (418). Otherwise, the debug codes are transmitted (418) immediately.

If (420), at any time from when the change in register 240 is identified, before or during a transmission (418) of debug codes, controller 244 identifies a request of core 202 to read the keyboard input from keyboard register 206, the transmission of the debug codes is aborted (422). In addition, multiplexer 252 is set to transfer the contents of lines 132A onto lines 132B for the minimal settling period and bus 212 is optionally stalled (424) until after the minimal settling period. After the reading from keyboard register 206 is completed, controller 244 optionally transmits the debugging codes currently in registers 240.

If (430) after the transmission (418) of the debug codes, an attempt to read the keyboard input is identified, the bus 212 is stalled (432) until at least the minimal settling period from the end of the transmission (418) passes, during which period the content of lines 132B are uninterrupted by debug codes.

Figure 8:
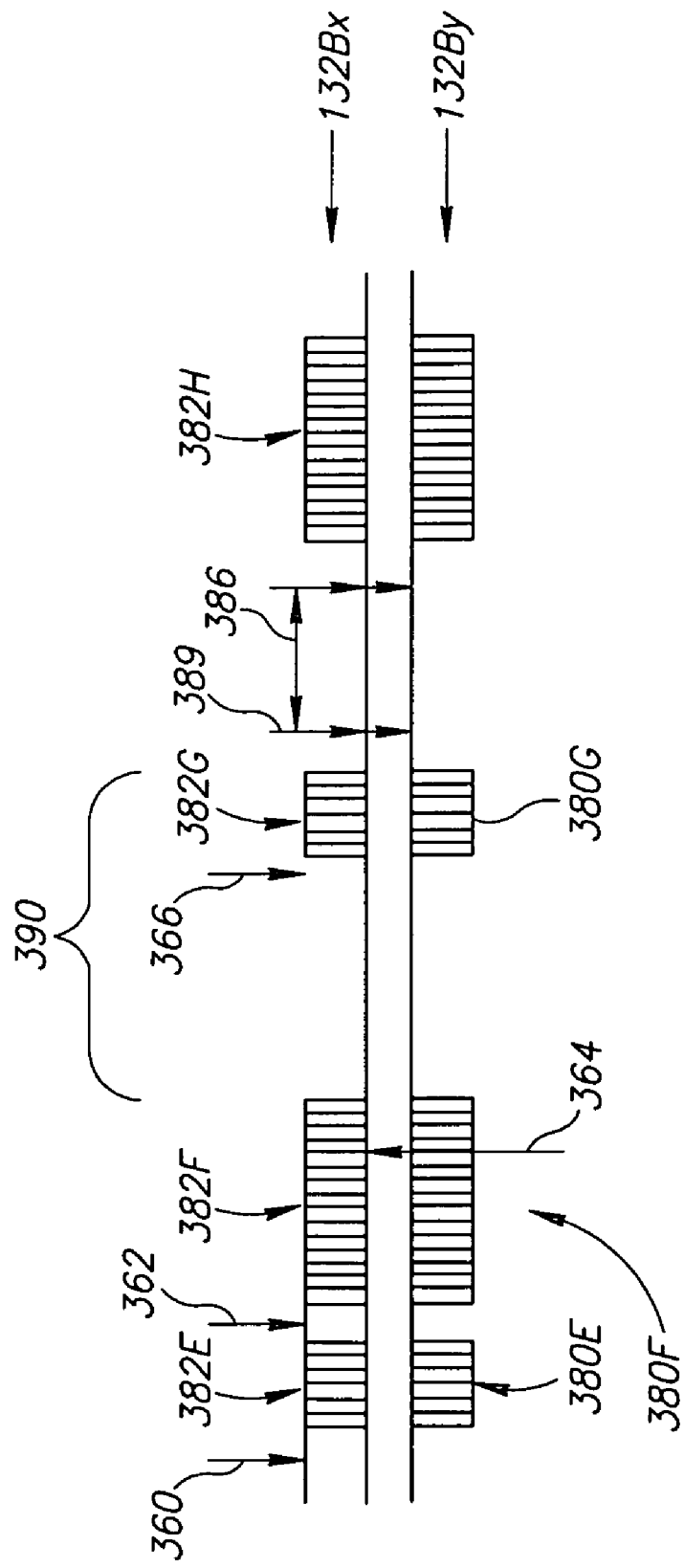
FIG. 8 is a schematic illustration of the signals transmitted on multi-purpose lines, in accordance with an exemplary embodiment of the present invention.

FIG. 8 is a schematic illustration of the signals transmitted on lines 132B, in accordance with another exemplary embodiment of the present invention, following a variation of the method of FIG. 7. When the value in a register 240 (FIG. 2) changes, an occurrence represented in FIG. 8 by arrow 360, controller 244 initiates transmission of the contents of the registers 240. The transmission includes a burst 382E on a first line 132Bx, accompanied by a clock signal 380E on the second line 132By. In some embodiments of the invention, if a second change 362 in the contents of register 240 occurs before the transmission of burst 382E is completed, controller 244 instructs serial converter 242 to abort the current transmission and to begin a new transmission 380F and 382F. In the example of FIG. 8, before the transmission of burst 382F was completed, the value on line 132A changed, beginning a keyboard scan signal 390, at a time point indicated by arrow 364. This change does not affect the operation of controller 244 and burst 382F is transmitted until its completion.

When the values in registers 240 change again 366, another burst 382G is transmitted. During the transmission of burst 382G, however, scan signal 390 is to end, and a read instruction 389 appears on line 214. The burst 382G is aborted, multiplexer 252 is set to transfer the scan signal from line 132A onto line 132Bx, and bus 212 is stalled for the minimal settling period 386. After settling period 386, bus 212 is released and the keyboard input from register 206 is read by core 202. Thereafter, debug codes are transmitted (426) in a burst 382H.

In the above description, when a change in the values of registers 240 is identified during a burst 382E, the burst is aborted and the new values are transmitted. Alternatively to aborting an old transmission in the middle when a new change in registers 240 is identified, controller 244 allows the old transmission to be completed and only then initiates the new transmission. In some embodiments of the invention, controller 244 manages a counter for the number of times a transmission was interrupted for a new transmission. If a current interrupt belongs to a sequence of transmission interruptions including fewer interruptions than a predetermined threshold, the transmission is interrupted for the new transmission. However, if the transmissions from registers 240 were interrupted at least the threshold number of times consecutively, the current transmission is not interrupted due to the change in the value in register 240. In an exemplary embodiment of the invention, the threshold is 1 or 2. Thus, instances where fast changes in register 240 prevent the codes from being exported are avoided.

In some embodiments of the invention, the decision as to whether to wait or interrupt a previous transmission depends on the specific code values and/or the extent of the change. For example, some codes may be considered less important and not requiring immediate output, while other codes may be considered more urgent. Alternatively or additionally, when only one of registers 240 has a change of value, controller 240 waits until the previous transmission is completed. In contrast, when both registers 240 change values, the previous transmission is interrupted.

Third Embodiment

Figure 9:
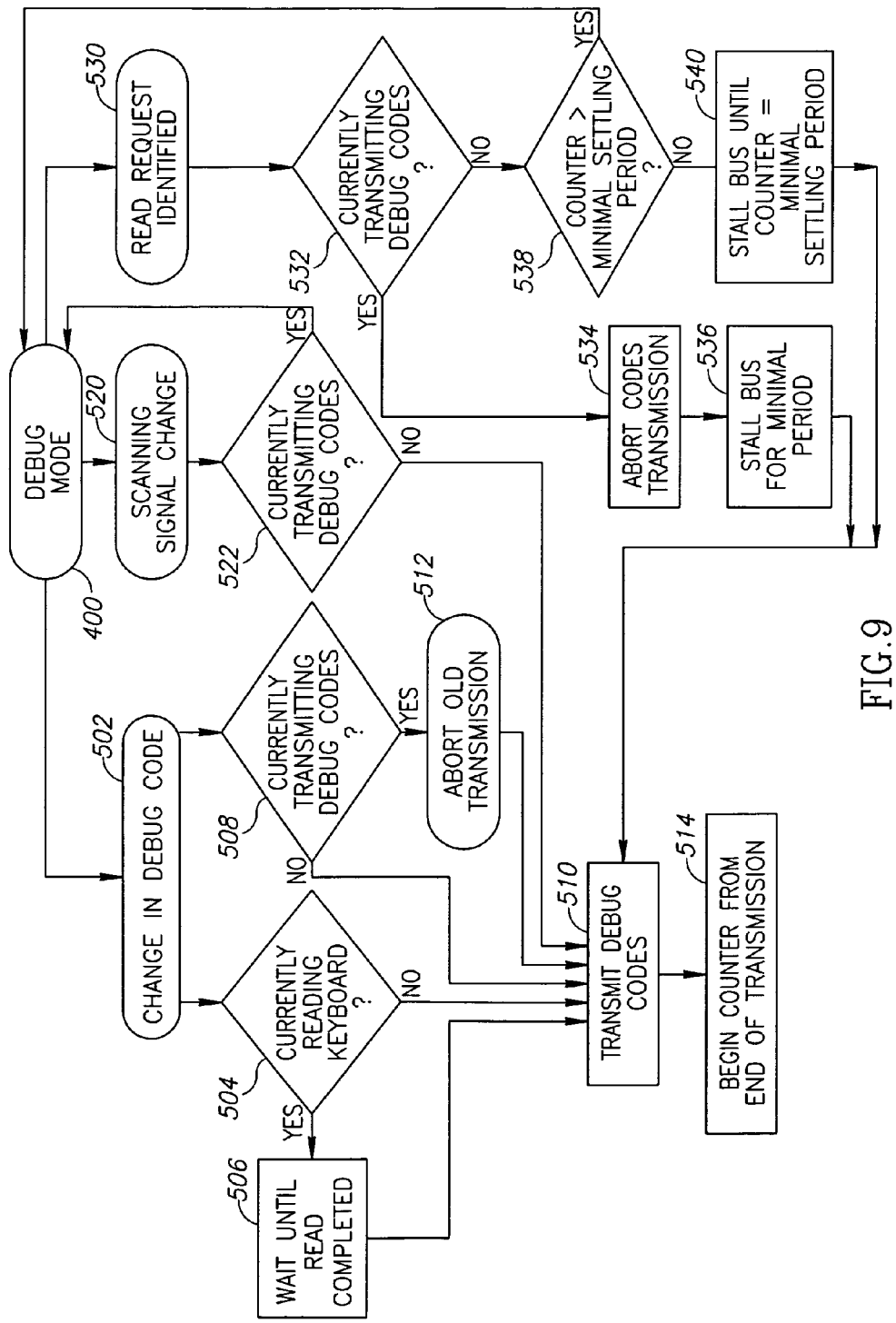
FIG. 9 is a flowchart of acts of a controller, in accordance with still another exemplary embodiment of the invention.

FIG. 9 is a flowchart of acts of controller 244, in accordance with still another exemplary embodiment of the invention. In the embodiment of FIG. 9, controller 244 comes into action during debug display mode 400, in response to any one of three occurrences. In a first occurrence, there is a change in the debug code (502) in one of registers 240 and controller 244 responds with an attempt to send the new debug codes to display 110. Controller 244 checks whether (504) core 202 is currently reading the keyboard input from keyboard register 206. If (504) the keyboard input is being read, controller 244 waits (506) until the reading is completed and the read indication on line 214 is turned off, and then controller 244 initiates transmission of the debug codes (510). If (508) when the change in register 240 is identified, a previous transmission of debug codes is underway, the previous transmission is optionally aborted (512) and then the current codes are transmitted (510). As mentioned above, in an alternative embodiment, controller 244 waits until the previous transmission is completed and only then transmits the new codes.

After the transmission (510) is completed, controller 244 moves multiplexer 252 to the state in which it transfers the contents of lines 132A to lines 132B. In addition, controller 244 begins counting (514) the time from the end of the transmission, to allow determination of whether a read signal on line 214 is received a sufficient time after the end of the previous burst 382. Controller 244 then returns to debug display mode 400, and waits for additional operation stimulus to occur.

A second occurrence in which controller 244 moves into action is when there is a change (520) on one of lines 132A that carry keyboard scan signals 312, indicating the beginning or end of a scanning signal. Responsive to the change, if (522) a transmission of the debug codes is not currently in progress, controller 244 initiates a transmission (510) of the debug codes. After the transmission is completed, multiplexer 252 is switched back to transferring the signals from lines 132A. Because the switching is performed at the end of a burst 382, it does not interfere with the operation of display 110. A counter is started (514) after the transmission, as mentioned above.

A third occurrence in which controller 244 intervenes in accordance with the present embodiment, is when a read signal is identified (530) on line 214, indicating that core 202 wants to read the keyboard signals from keyboard register 206. If the reading is performed only a short time after the transmission of the debug codes, the keyboard outputs may not have settled yet and therefore the contents of keyboard register 206 may be incorrect. Accordingly, in some embodiments of the invention, if (532) when a read request is identified, debug codes are currently being transmitted, the transmission is aborted (534), the state of multiplexer 252 is changed so that the keyboard scan signal is transferred to line 132B and bus 212 is stalled (536) for the minimal settling period of keyboard 122. After the minimal settling period is over, controller 244 releases bus 212 and core 202 succeeds to read the contents from keyboard register 206. In some embodiments, after the reading is completed, controller 244 initiates transmission (510) of the debug codes, in place of the transmission which was aborted.

If (532) debug codes are not currently being transmitted when the read signal is identified (530), the counter of the time from the end of the previous burst signal is compared to the minimal settling period. If (538) the counter has a longer period than the minimal settling period, no action is taken by controller 244. If (538), however, the counter is smaller than the minimal settling period, bus 212 is stalled (540) at least until the counter reaches the minimal settling period. Thereafter, controller 244 releases the bus and allows core 202 to proceed with its operation. In some embodiments, after the reading is completed, controller 244 initiates transmission (510) of the debug codes, in case a transmission was interrupted. Alternatively, transmission codes are transmitted after the bus is released only if it is known that a transmission was interrupted.

As mentioned above, in some embodiments of the invention, the debug codes are not transmitted after each change in the keyboard scan signals. For example, where display 110 is configured to ignore such changes and/or a strobe is used to prevent the changes from affecting the values actually displayed. The method of FIG. 9 may be updated to such embodiments by eliminating blocks 520 and 522.

Firmware Independence

In the above embodiments, controller 244 is designed to operate in a manner independent of keyboard control process 208 and/or any other firmware of core 202. Accordingly, when switching between regular mode 480 and debug display mode 400, there is no need to change the firmware in any way. In addition, the programmer of keyboard control process 208 is not required to adjust the programming to the operation of controller 244. Additionally, controller 244 optionally cannot query keyboard control process 208 for information, such as the time remaining until the end of a scan signal and/or the duration of scan signals. It is noted that controller 244 may operate with a keyboard control process 208 which waits different periods of times between applying keyboard scanning signals and reading the keyboard results and/or with different types of keyboard matrices. These embodiments are especially useful when the firmware of controller 202 is programmed by an entity different from that designing EC 104.

In other embodiments of the invention, the delay in reading results from keyboard register 206 is performed by core 202 without a need to stall bus 212. Optionally, keyboard control process 208 is configured to delay the reading upon receiving an instruction from hardware controller 244. Alternatively, the timing of the reading of keyboard register 206 by keyboard control process 208 is changed when EC 104 moves into debug display mode 400, to allow for at least the minimal settling period between the debug code bursts and the keyboard reading. The change may be implemented for all lines 132 or only for lines 132B.

In still other embodiments of the invention, controller 244 receives timing information of the keyboard scan signals and avoids transmitting debug codes within a predetermined time before the keyboard is to be read by keyboard control process 208.

Move Into Debut Mode

Optionally, EC 104 moves from regular mode 480 into debug display mode 400, responsive to a direct or indirect instruction from a human user. An indirect instruction may be provided, for example, by connecting display 110 to EC 104. In some embodiments of the invention, at start-up, one of the pins of EC 104 serves as a strap pin which selects the operation mode (debug mode 400 or regular mode 480). This pin is optionally connected in parallel to lines 132B, to an interface for connecting a debug-keyboard unit. When display 110 is plugged in, a Vcc voltage level, for example, is connected to the strap pin and EC 104 moves into debug mode. When display 110 is not connected to EC 104, a ground voltage is connected to the strap pin and the regular mode is selected.

With some embodiments of the invention, technicians are supplied with a unit including both keyboard 122 and debug code display 110 within a single casing. When debugging of a computer is required, the standard keyboard of the computer is optionally disconnected and the technician keyboard 122 is connected in its place.

Alternatively or additionally, EC 104 automatically assumes the debug display mode, whenever an error in operation is detected. Optionally, in switching between a regular mode in which the debug codes are not provided and a debug mode in which the codes are provided, the firmware of core 202 is not changed, so as to allow debugging under the same conditions as were existing before moving into the debug mode.

Alternatives

While EC 104 is shown as having two debug code registers 240 in FIG. 2, the present invention may be implemented for a processor having only one register 240, having three or more registers, or using other devices for collecting debug codes, such as latches, for example. In some embodiments of the invention, in which a plurality of registers 240 are available, some or all of the debug code transmissions include the contents of fewer than all the registers 240, possibly only a single register. Transmitting only a single register may be used for all debug code transmissions or transmitting the contents of only a single register 240 may be used in scenarios where collisions with the keyboard scan signals are more likely. In an exemplary embodiment of the invention, when a change in one of registers 240 is identified, the contents of all the registers 240 are transmitted if no keyboard scan signals are currently placed on lines 132A, but the contents of only a single register 240 are transmitted when one of lines 132A carries a scan signal, since a need to stall bus 212 is relatively likely to occur.

Alternatively or additionally, controller 244 entirely avoids transmitting debug codes responsive to changes in the contents of one or more of registers 240, when one of lines 132A carries a scan signal. While this may delay the transmission of some codes slightly, it substantially reduces, and possibly totally eliminates, the chances that core 202 will attempt to read from keyboard register 206 while debug codes are being transmitted or shortly after the debug codes are transmitted. This alternative is optionally used when scanning signals 312 are relatively short, for example up to three or five times the length of debug code bursts or even only up to 1-2 times the length of the debug code bursts.

On the other hand, embodiments in which debug codes are transmitted even when scanning signals are placed on lines 132A are optionally used when scanning signals 312 are relatively long, for example at least five, ten or even 20 times the period required to transmit the content of registers 240. Alternatively or additionally, embodiments in which debug codes are transmitted even when scanning signals are placed on lines 132A are used when it is inconvenient for controller 244 to detect whether a scanning signal is currently provided on one of lines 132A, for example when the detection is based on identifying toggling instructions. Optionally, in such embodiments, hardware controller 244 delays transmission of the contents of registers 240 when the contents of one of the registers is changed only if core 202 is currently reading the scan results from keyboard register 206 or if a previous debug-code transmission is in progress.

Alternatively to aborting transmission of debug codes when a keyboard read command is identified, bus 212 is stalled while the debug codes are transmitted, and is released only after lines 132B carry the keyboard scan signals for the required minimal settling period. While this alternative slightly lengthens the period during which bus 212 is stalled, it avoids possible flickers in display 110. In some embodiments of the invention, controller 244 determines whether to abort the transmission or to stall the bus until the transmission is completed, responsive to the time remaining until the end of the transmission of the debug codes.

In the above description, two pins of the processor are used for transmitting debug codes: one for the information and one for the clock signal. In other embodiments of the invention, only a single pin is used for the transmission of the debug codes, for example using an asynchronous transmission method or an external clock. In still other embodiments of the invention, three or more pins are used for transmitting the debug codes, optionally a pin is used for each bit in registers 240 and/or all the pins of EC 104 used for keyboard output signals are also used for transmission of debug codes. Such embodiments achieve a faster transmission of the debug codes. In some embodiments of the invention, for each transmission, controller 244 selects which lines of a plurality of keyboard lines connected to display 110 will be used for the debug codes, according to the current usage of the lines for keyboard scan. Debug code display 110 is adapted to identify the lines on which the signals are transmitted at the beginning of each transmission, using any suitable method known in the art.

The term pins as used herein and in the claims is to be understood broadly, as referring to any connection between the processor and its surroundings. Therefore, the pins may have the conventional wire bonding "leg" shape or may be based on other types of couplings, such as solder sphere couplings used in ball grid array packages.

While in the above description controller 244 is implemented by hardware, in other embodiments some or all of the tasks of controller 244 are implemented by firmware on core 202. Optionally, in such embodiments, keyboard control process 208 is adapted to communicate with the controller process.

End Remarks

It will be appreciated that the above described description of methods and apparatus are to be interpreted as including apparatus for carrying out the methods and methods of using the apparatus. It should be understood that, where appropriate, features and/or steps described with respect to one embodiment may be used with other embodiments and that not all embodiments of the invention have all of the features and/or steps shown in a particular figure or described with respect to a specific embodiment. Variations of embodiments described will occur to persons of the art.

It is noted that at least some of the above described embodiments include non-limiting details which were provided by way of example for illustration purposes and/or to describe the best mode contemplated by the inventors and therefore may include structure, acts or details of structures and acts that are not essential to the invention. Structure and acts described herein are replaceable by equivalents known in the art, which perform the same function, even if the structure or acts are different. Many alternative implementation details may be used. Therefore, the scope of the invention is limited only by the elements and limitations as used in the claims, wherein the terms "comprise," "include," "have" and their conjugates, shall mean, when used in the claims, "including but not necessarily limited to."

We claim:
1. A processor, comprising:
a core configured to control a keyboard;
a plurality of pins connected to the core, configured to transfer signals from the processor to the keyboard;
one or more registers; and
a controller configured to transfer signals from the one or more registers through at least one of the pins, intermittently with signals transferred to the keyboard,
wherein the controller is configured to monitor communications between the core and the keyboard to identify specific occurrences and to control the timing of transmissions through the at least one of the pins responsive to identified specific occurrences and to abort transmission of content from the one or more registers through the at least one of the pins, after the transmission of the content has began, in response to one or more occurrences in the processor.

2. A processor according to claim 1, wherein the core comprises an embedded controller configured to control systems of a notebook computer.

3. A processor according to claim 1, wherein the one or more registers comprise at least two registers.

4. A processor according to claim 1, wherein the one or more registers comprise debug code registers configured to store debug codes of the processor.

5. A processor according to claim 1, wherein the one or more registers comprise debug code registers configured to store debug codes of a different processor, than the processor including the registers.

6. A processor according to claim 1, wherein the controller is configured to transfer content from the one or more registers through the at least one of the pins each time a change in signals directed to the keyboard transmitted through the at least one pins is identified.

7. A processor according to claim 1, wherein the controller is configured to initiate transfer of content from the one or more registers through the at least one of the pins each time there is a change in a value of the one or more registers.

8. A processor according to claim 7, wherein the controller is configured to delay transfer of content from the one or more registers through the at least one of the pins when it is identified that the core is reading signals from the keyboard.

9. A processor according to claim 1, wherein the controller is configured to abort transmission of content from the one or more registers through the at least one of the pins, in response to a request to read input from the keyboard.

10. A processor according to claim 1, wherein the controller is configured to abort transmission of content from the one or more registers through the at least one of the pins, in response to a change in the content of the one or more registers.

11. A processor according to claim 1, wherein the processor has a normal state in which the controller is inactive and a debug display mode in which the controller is active, and wherein the core is configured with firmware which is not changed in the switching between the normal state and the debug display mode.

12. A processor according to claim 1, wherein the controller is configured to operate properly without cooperation from firmware of the core.

13. A processor according to claim 1, wherein the controller is configured to delay reading of input from the keyboard until sufficient time has passed from transferring signals from the one or more registers through the one or more pins, responsive to a determination that the core is attempting to read from the keyboard.

14. A processor according to claim 13, wherein the controller is configured to delay reading of input from the keyboard by stalling a bus of the processor.

15. A processor according to claim 1, wherein the controller is configured to provide a strobe signal along with each transfer of signals from the one or more registers.

16. The processor of claim 1, wherein the controller is configured to initiate transfer of signals from the one or more registers through the at least one pin whenever there is a change in the signals provided by the core on the at least one pin and the one or more registers are not already transferring signals on the at least one pin.

17. A processor according to claim 16, wherein the controller comprises a debug code provider.

18. A processor according to claim 16, wherein the controller provides signals which change at an order of magnitude faster than the signals provided by the first unit.

19. A processor according to claim 16, wherein the controller provides a strobe signal with the signals which change at an order of magnitude faster than the signals provided by the first unit.

20. A processor according to claim 1, wherein the controller is configured to control the timing of transmissions through the at least one of the pins responsive to identified changes in the transmissions directed to the keyboard through the at least one of the pins.

21. A processor according to claim 1, wherein the controller is configured to control the timing of transmissions through the at least one of the pins responsive to identifying that the core is reading signals from the keyboard.

22. A processor according to claim 1, wherein the controller is configured to extend the transfer duration of keyboard scanning signals from the core responsive to identified changes.

23. A processor, comprising: a core configured to control a keyboard;
a plurality of pins connected to the core, configured to transfer signals from the processor to the keyboard; one or more registers; and a controller configured to transfer signals from the one or more registers through at least one of the pins, intermittently with signals transferred to the keyboard, wherein the controller is configured to monitor communications between the core and the keyboard to identify specific occurrences and to control the timing of transmissions through the at least one of the pins responsive to identified specific occurrences, wherein the controller is configured to stall the operation of the core, responsive to a determination that a transmission from the one or more registers through the at least one of the pins may interfere with correct operation of the core.

24. A processor according to claim 23, wherein the controller is configured to ensure that output from the core is provided without interruption through the at least one pin for at least a predetermined time before the core reads input from the keyboard.

25. A processor according to claim 23, wherein the controller is configured to abort transfer of signals from the one or more registers responsive to at least one specific occurrence within the processor.

26. A processor according to claim 23, wherein the controller comprises a debug code provider.

27. A method of outputting information from a processor, comprising:

storing information in one or more registers within a processor;

providing keyboard scan signals via a specific pin of a processor;

transmitting the information stored in the one or more registers, via the specific pin of the processor, intermittently with the keyboard scan signals; and monitoring communications between the keyboard and the processor;

identifying a specific occurrence from the monitored communications; and controlling the timing of transmissions via the specific key, responsive to identifying the specific occurrence and aborting transmission of content from the one or more registers through the at least one of the pins, after the transmission of the content has began, in response to the specific occurrence.

28. A method according to claim 27, wherein storing the information comprises storing debug codes.

29. A method according to claim 27, wherein providing keyboard scan signals via the specific pin comprises providing the scan signals less than 10% of the processor operation time.

30. A method according to claim 27, wherein transmitting the information comprises initiating transmission of the information each time the keyboard scan signal begins or ends, unless the state of the processor requires delay of the transmission.

31. A method according to claim 27, wherein transmitting the information comprises transmitting at times selected independent of timing of a keyboard scan process providing the keyboard scan signals.

32. A method according to claim 27, wherein transmitting the information comprises transmitting at times selected independent of whether keyboard scan signals are being provided via the specific pin.

33. A method according to claim 27, comprising stalling a keyboard read process of the processor responsive to identification of an attempt to read a state of the keyboard within a minimal settling time from a transmission of the information.

* * * * *